United States Patent Office 2,907,669
Patented Oct. 6, 1959

2,907,669

TREATMENT OF HYDROCARBON DRYING OILS WITH EPOXIDIZED TRIGLYCERIDE OILS

George H. Tulk, Jr., Elyria, and Theodore A. Neuhaus, Rocky River, Ohio, assignors to The Glidden Company, Cleveland, Ohio, a corporation of Ohio No Drawing. Application June 7, 1956
Serial No. 589,854

14 Claims. (Cl. 106—265)

This invention relates to new coating compositions prepared by blending minor amounts of epoxidized glyceride oils with hydrocarbon drying oils such as liquid polybutadiene or oily butadiene-styrene copolymers. We have discovered that such blended mixtures yield cured coating films which exhibit increased flexibility and adhesion, and improvement in other properties.

Accordingly, it is the primary object of this invention to provide new coating compositions of the types described. Other objects will be apparent from the following description of our invention.

Hydrocarbon drying oils such as liquid polybutadiene (U.S. 2,631,175), the drying oils of U.S. Patent No. 2,650,209 and the sodium-polymerized butadiene-styrene copolymer drying oils (U.S. 2,652,342, 2,636,910, 2,672,-425, 2,559,947, and others), while having numerous advantageous coating properties, lack sufficient flexibility to permit coatings thereof to successfully withstand bending and other forming operations to which coated metal sheets are subjected in their course of manufacture into various products, e.g., cans. Attempts to improve the flexibility have heretofore been of little success. Other hydrocarbon drying oils likewise have had various shortcomings which can be overcome advantageously by utilizing the principles of the present invention.

The diene-containing drying oils mentioned above have also exhibited an undesired sensitivity to surface conditions encountered on and associated with tinplated iron sheet of the type used in cans and other metal products, and a pronounced tendency to give "enamel hairs" when the coated tinplate is sheared. Such "hairs" constitute a nuisance in the can plant and create a somewhat serious cleaning problem in that the hairs must be removed thoroughly to ensure that the cans are clean when shipped from the plant.

We have now discovered that the flexibility and the forming and fabricating properties of hydrocarbon drying oil coatings can be materially improved by blending the oils with up to an equal weight of epoxidized triglyceride oil. We have also discovered that the films obtained from such blends have less sensitivity to surface conditions on tinplate and have improved resistance to the formation of "enamel hairs." At least about 5% of the epoxidized oil is needed to manifest noticeable improvement in the foregoing properties and we prefer at least 10%. We especially prefer to use between 20% and 30% by weight on the hydrocarbon drying oil(s).

The sodium-polymerized diene-derived drying oils especially contemplated for use in our invention are those which contain 60-100% $C_4$-$C_6$ conjugated diolefin and 0-40% vinyl aromatic monomer, with or without small amounts of maleic anhydride or other acid modifiers disclosed in U.S. Patent 2,652,342. These copolymer drying oils have molecular weights between about 1000 and 10,000, preferably 2000-5000 and can be heat-treated as taught in U.S. Patent No. 2,672,-425 or blown as taught in the Kiebler et al. application Ser. No. 377,242, filed August 28, 1953, or the copending application of T. A. Neuhaus and H. J. Kiefer, Ser. No. 513,606, filed June 6, 1955. Where the oil is blown in solvent, the oxygen content can be between 6% and 22%, preferably 9–18%. We prefer the 75–85% butadiene/10–40% vinyl aromatic monomer oils, especially those prepared from 25–15% styrene, and particularly prefer the maleic-modified oils of these proportions.

The epoxidized triglyceride oils contemplated for use in the invention are those having at least 2% oxirane oxygen and preferably containing between about 2% and 7% oxirane oxygen, as measured by the method of Swern (Ind. and Eng. Chem. Anal. Ed., 1947, vol. 19, page 414). Epoxidized oils of such oxygen content can be prepared from drying and semi-drying oils and from any other triglyceride oils which have sufficient unsaturation in the acid radicals thereof to permit epoxidation to the extent indicated. The triglyceride oils can be of any origin; i.e., vegetable, animal, marine or synthetic. Epoxidation of the oils can be secured in various ways well known to those skilled in the art, and suitable methods are disclosed by Findley in the Journal of the American Chemical Society, vol. 67, p. 412, by Swern and Findley in U.S. Patent 2,569,502, and by Niederhauser et al. in U.S. Patent No. 2,485,160. Epoxidized triglyceride oils are currently available also as proprietary products of commerce.

It should be understood that we contemplate the use of mixtures of hydrocarbon drying oils as well as the use of a single oil, and that we contemplate the use of mixtures of epoxidized triglyceride oils with a single drying oil or a mixture of drying oils.

The blends of hydrocarbon drying oil(s) and epoxidized oil(s) are unexpectedly compatible, even when simply mixed together at room temperatures. Thus no heating or other expensive and/or time consuming operation is needed to prepare them.

The following examples illustrate the principles and benefits of the invention. Parts and percentages by weight are expressed unless otherwise stated.

*Example 1*

Sodium-polymerized butadiene (75%)-styrene (25%) copolymer drying oil which had been prepared and modified with maleic anhydride as taught in U.S. Patent No. 2,652,342, and which was in the form of a solution having a non-volatile content of 50%, was provided. One hundred seventy parts thereof were mixed with fifteen parts of epoxidized soya oil (2.6% oxirane oxygen) and with 15 parts of mineral spirits. By stirring the mixture briefly at room temperature a homogeneous solution was prepared. The resulting solution was used as a coating composition for tinplate, and after being applied by roll-coating or spraying, was baked for 10 minutes at 415° F. Comparative tests of the coated tinplate and of tinplate coated with a comparable mixture having no epoxidized soya oil therein, revealed that the presence of the epoxidized oil noticeably improved the adhesion and reduced the occurrence of "enamel-hairs" on shearing. When an analogous composition was prepared from the same butadiene-styrene copolymer drying oil, but without being modified with maleic anhydride, the presence of the same epoxidized oil in the same proportions again revealed substantially the same improvement in adhesion and reduction in "enamel-hairs," but the coating was slightly softer.

*Example 2*

When 150 parts of the maleic-modified copolymer drying oil of Example 1 were blended with 25 parts of the epoxidized soya oil of Example 1 and with 25 parts of mineral spirit, the resulting coating, after baking on tinplate, had better flexibility and adhesion than the coating of Example 1 and exhibited little to no fracturing on shearing.

When the proportions were again changed to combine 100 parts of the drying oil solution with 50 parts of the epoxidized soya oil and 50 parts of mineral spirits, the resulting baked coating was free of "enamel hairs" when sheared, but was somewhat soft and easily scratched.

Comparable results were secured when the maleic-modified copolymer drying oils of the coatings were replaced with unmodified (i.e., maleic-free) but otherwise similar copolymer drying oil. In all tests, the coatings were baked for 10 minutes at 415° F.

*Example 3*

One hundred fifty parts of the maleic-modified drying oil of Example 1 was blended with 25 parts of epoxidized soya oil (oxirane value of 2.95%) and 25 parts of mineral spirits. Substantially the same properties were observed in the baked coating as were observed in the coating of Example 2. This coating air dries satisfactorily when small amounts of conventional driers are added.

*Example 4*

Sodium-polymerized butadiene (75%)-styrene (25%) copolymer drying oil unmodified with maleic anhydride was dissolved in solvent and was blown with air until it had an oxygen content of 10% (as $O_2$). The blown oil had a Z body (Gardner-Holdt) at 35% NVM. One hundred fifty parts of a 50% NVM solution of the blown oil was mixed with 25 parts of the epoxidized soya oil of Example 1 and with 25 parts of mineral spirits. The resulting coating was applied to tinplate, baked 10 minutes at 415° F., and tested. Its properties were substantially the same as those described for the analogous coatings of Examples 2 and 3.

The blowing of hydrocarbon drying oil solution is claimed in the copending application of Neuhaus and Kiefer, supra.

*Example 5*

An unmodified butadiene-styrene copolymer drying oil like that of Example 4 was heat-bodied to a viscosity of U–V at 50% NVM in mineral spirits. One hundred fifty parts of a 50% solution of the bodied oil in mineral spirits was mixed with 25 parts of the epoxidized soya oil of Example 1 and with 25 parts of mineral spirits. The baked coating on tinplate exhibited substantially the same properties as the comparably-proportioned coatings of Examples 2 and 3. Coatings of good flexibility and adhesion result when small amounts of conventional driers are added to the composition and the composition is air dried, or when baked under conventional baking schedules with or without added driers.

*Example 6*

Equally good results were found when the epoxidized soya oil of Example 5 was replaced with epoxidized soya oil having an oxirane oxygen content of 6.3%.

*Example 7*

Equally good results were secured when the butadiene-styrene oil of Example 5 was replaced with sodium polymerized polybutadiene drying oil. This drying oil is completely miscible with epoxidized soya oil (6.3% oxirane) when the latter amounts to 5–50% by weight thereon.

*Example 8*

An excellent aluminum-pigmented coating for black iron containers was prepared by adding ½ lb. of non-leafing aluminum pigment per gallon of clear vehicle to the drying oil-epoxidized soya oil-mineral spirits coating of Example 2. Baking converted the applied coating to a durable, attractive protective film.

*Example 9*

In like manner an attractive coating can be prepared by replacing the non-leafing pigment of Example 8 with ¾ or 1 pound of leafing aluminum per gallon of the clear vehicle of Example 2.

Having described our invention, what we claim is:

1. A novel film-forming composition of matter having improved properties, comprising a homogeneous mixture of (a) synthetic polymeric sodium-polymerized hydrocarbon drying oil prepared from 60–100% $C_4$–$C_6$ conjugated diolefin, balanced monocyclic vinyl aromatic monomer and (b) from about 5% to 50% by weight on said drying oil of epoxidized triglyceride oil selected from the group consisting of drying and semi-drying oils, said epoxidized oil having an oxirane oxygen content between about 2% and 7% by weight.

2. A composition as claimed in claim 1 which includes a small amount of drier and thereby is air drying.

3. A novel film-forming composition of matter having improved coating properties, comprising a homogeneous mixture of (a) synthetic polymeric sodium-polymerized hydrocarbon drying oil selected from the class consisting of polybutadiene drying oils and oily copolymers composed of 60–90% by weight of conjugated diolefin having 4 to 6 carbon atoms and 40–10% of combined monocyclic vinyl aromatic hydrocarbon monomer, and (b) from about 5% to 50% by weight on said synthetic drying oil of epoxidized triglyceride oil selected from the group consisting of drying and semi-drying oils, said epoxidized triglyceride oil having an oxirane oxygen content between about 2% and 7% by weight.

4. A composition as claimed in claim 3 wherein the hydrocarbon drying oil is a synthetic oily copolymer of butadiene and styrene.

5. A composition as claimed in claim 4 wherein the epoxidized triglyceride oil amounts to 10% to 50% by weight on the hydrocarbon oil.

6. A composition as claimed in claim 5 wherein the epoxidized oil amounts to about 20%–30% by weight on the hydrocarbon oil.

7. A composition as claimed in claim 5 wherein the hydrocarbon drying oil has been blown in solvent to an oxygen content of 6–22% by weight.

8. A composition as claimed in claim 7 wherein the oxygen content of the blown oil is 9–18% by weight.

9. A composition as claimed in claim 8 wherein the epoxidized oil amounts to about 20%–30% by weight on the blown hydrocarbon oil.

10. A composition as claimed in claim 9 wherein the butadiene is 75–85% and the styrene is 25–15%.

11. A novel film-forming composition of matter having improved coating properties, comprising a homogeneous mixture of (a) synthetic sodium-polymerized hydrocarbon drying oil prepared from 60–90% of butadiene and 40–10% of styrene, and (b) from about 5–50% by weight on said hydrocarbon drying oil of epoxidized triglyceride oil selected from the group consisting of epoxidized drying and semi-drying oils, said epoxidized triglyceride oil having an oxirane oxygen content between about 2% and 7% by weight.

12. A composition as claimed in claim 11 wherein the epoxidized triglyceride oil amounts to 20–30% and the composition includes a small amount of drier and thereby is air-drying.

13. A novel film-forming composition of matter having improved coating properties, comprising a homogeneous mixture of (a) sodium-polymerized synthetic polybutadiene hydrocarbon drying oil and (b) from about 10% to 50% by weight on said polybutadiene drying oil of epoxidized triglyceride oil selected from the group consisting of epoxidized drying and semi-drying oils, said epoxidized triglyceride having an oxirane oxygen content between about 2% and 7% by weight.

14. A composition as claimed in claim 13 wherein the epoxidized triglyceride oil amounts to about 20%–30% by weight on said polybutadiene oil.

References Cited in the file of this patent

UNITED STATES PATENTS

| | | |
|---|---|---|
| 2,131,195 | Schneider | Sept. 27, 1938 |
| 2,471,577 | Moffett | May 31, 1949 |
| 2,485,160 | Niederhauser et al. | Oct. 18, 1949 |
| 2,569,502 | Swern et al. | Oct. 2, 1951 |
| 2,652,342 | Gleason | Sept. 15, 1953 |
| 2,672,425 | Gleason | Mar. 16, 1954 |
| 2,709,662 | Kolnecke et al. | May 31, 1955 |

FOREIGN PATENTS

| | | |
|---|---|---|
| 363,348 | Great Britain | Dec. 7, 1931 |

OTHER REFERENCES

Swern Ind. & Chem. Anal. Ed., 19, pp. 414–415.